US009515825B2

(12) United States Patent
Yoon et al.

(10) Patent No.: US 9,515,825 B2
(45) Date of Patent: Dec. 6, 2016

(54) METHOD FOR PASSWORD BASED AUTHENTICATION AND APPARATUS EXECUTING THE METHOD

(71) Applicants: SAMSUNG SDS CO., LTD., Seoul (KR); INDUSTRY-ACADEMIA COOPERATION GROUP OF SEJONG UNIVERSITY, Seoul (KR)

(72) Inventors: Hyo-Jin Yoon, Seoul (KR); Tae-Kyoung Kwon, Seoul (KR)

(73) Assignees: SAMSUNG SDS CO., LTD., Seoul (KR); INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 54 days.

(21) Appl. No.: 14/067,232

(22) Filed: Oct. 30, 2013

(65) Prior Publication Data

US 2014/0122888 A1    May 1, 2014

Related U.S. Application Data

(60) Provisional application No. 61/720,615, filed on Oct. 31, 2012.

(30) Foreign Application Priority Data

Oct. 31, 2012  (KR) .................. 10-2012-0121951
May 24, 2013  (KR) .................. 10-2013-0059249

(51) Int. Cl.
  *H04L 29/06*  (2006.01)
  *H04L 9/08*   (2006.01)
(52) U.S. Cl.
  CPC ........... *H04L 9/0844* (2013.01); *H04L 9/0838* (2013.01); *H04L 9/0847* (2013.01); *H04L 63/083* (2013.01)

(58) Field of Classification Search
  CPC ..... H04L 9/0838; H04L 9/0847; H04L 63/083
  See application file for complete search history.

(56) References Cited

U.S. PATENT DOCUMENTS

| | | | |
|---|---|---|---|
| 2002/0026573 A1* | 2/2002 | Park .......................... | 713/155 |
| 2006/0271796 A1* | 11/2006 | Kaimal et al. ............. | 713/194 |
| 2008/0216153 A1* | 9/2008 | Aaltonen ................ | G06F 21/31 726/3 |
| 2009/0288143 A1* | 11/2009 | Stebila .................. | G06F 21/445 726/3 |
| 2011/0126015 A1* | 5/2011 | Shon et al. ................ | 713/171 |
| 2013/0124292 A1* | 5/2013 | Juthani ...................... | 705/14.26 |

OTHER PUBLICATIONS

Hao et al., "J-PAKE: Authenticated Key Exchange without PKI", 2010, pp. 192-206.*

* cited by examiner

*Primary Examiner* — Taghi Arani
*Assistant Examiner* — Thaddeus Plecha
(74) *Attorney, Agent, or Firm* — Sughrue Mion, PLLC

(57) ABSTRACT

Provided are an authentication method and an apparatus for the method. An authentication method includes generating, at a terminal, an identifier (ID)-based secret key using an ID of a user of the terminal and key generation factors exchanged with a server, encrypting, at the terminal, a password of the user using a symmetric key encryption algorithm taking the generated secret key as a symmetric key, and requesting authentication for the terminal user by transmitting the encrypted password to the server, and receiving, at the terminal, a response to the authentication request from the server.

22 Claims, 2 Drawing Sheets

METHOD FOR PASSWORD BASED AUTHENTICATION AND APPARATUS EXECUTING THE METHOD

CROSS-REFERENCE TO RELATED APPLICATION

This application claims priority to and the benefit of Republic of Korea Patent Application Nos. 10-2012-0121951 filed on Oct. 31, 2012 and 10-2013-0059249 filed on May 24, 2013, and also from U.S. of America Provisional Patent Application No. 61/720,615 filed on Oct. 31, 2012, the disclosures of all of which are incorporated herein by reference in their entirety.

BACKGROUND

1. Field

The present disclosure relates to network security technology, and more particularly, to an authentication method and an apparatus for the same.

2. Discussion of Related Art

Password authenticated key exchange (PAKE) is a process in which two or more parties participating in communication share a secret key for encrypted communication on the basis of a password that at least one of the parties knows. According to ways of implementing PAKE, PAKE may be classified into PAKE based on a public key certificate and PAKE based on a non-public key certificate.

PAKE based on a public key certificate involves a process of performing public key authentication for key exchange at all times, and when a private key of a server leaks, neither of the forward security and the backward security of the corresponding account is ensured. To solve such a problem of PAKE based on a public key certificate, PAKE based on a non-public key certificate (relevant standards: IEEE P1363.2 and ISO/IEC 11770-4) was proposed, but has a new problem in that migration of an existing system and parameter updates are difficult due to a verifier creation scheme of exponentiating a password itself and storing the result. In addition, since PAKE based on a public key certificate involves combining a password itself with a group parameter, a relatively large amount of real-time computation is necessary to cope with an offline analysis of the combination, and it is impossible to make message flow of a protocol flexible.

SUMMARY

The present disclosure is directed to providing an efficient authentication and key exchange protocol that has all merits of password authenticated key exchange (PAKE) based on a public key certificate and PAKE based on a non-public key certificate by applying identifier (ID)-based cryptography to existing PAKE.

According to an aspect of the present disclosure, there is provided an authentication method including: generating, at a terminal, an ID-based secret key K using an ID of a user of the terminal and key generation factors exchanged with a server; encrypting, at the terminal, a password of the user using a symmetric key encryption algorithm taking the generated secret key K as a symmetric key, and requesting authentication for the terminal user by transmitting the encrypted password to the server; and receiving, at the terminal, a response to the authentication request from the server.

The generating of the secret key K may include: transmitting, at the terminal, a first secret key element X calculated from a terminal-side random number x to the server; and receiving, at the terminal, a second secret key element Y from the server. Then, the terminal may generate the secret key K using the terminal-side random number x, the first secret key element X, the second secret key element Y, and the ID.

The terminal may generate a common hash value e using the first secret key element X, the second secret key element Y, and a hash value I of the ID, and generate the secret key K using the common hash value e, the terminal-side random number x, the first secret key element X, the second secret key element Y, and the hash value I of the ID.

The secret key K may be generated by hashing a first string including the common hash value e, the terminal-side random number x, the first secret key element X, the second secret key element Y, and the hash value I of the ID.

The first secret key element X may be calculated according to the following equation:

$$X = g^x$$

(where g is a generator of a cyclic subgroup G generated from $g = \hat{g}^2$ when a maximal cyclic subgroup of a finite group $Z_N = \{0, 1, 2, \ldots, N-1\}$ is $\hat{g}$, N is an integer satisfying N=pq, and p and q are prime numbers that satisfy p≡3 (mod 4) and q≡3 (mod 4) respectively).

The secret key K may be calculated according to the following equation:

$$K = h_1(X, (Y, I), (YI^e)^x)$$

(where $h_1$ is a first random hash function, I=H(ID), and H is a hash function satisfying H: $\{0, 1\}^* \rightarrow G$).

The authentication method may further include: after the transmitting of the encrypted password to the server, generating, at the terminal, a session key sk by hashing a string including the common hash value e, the terminal-side random number x, the first secret key element X, the second secret key element Y, and the hash value I of the ID using a second random hash function $h_2$; generating, at the terminal, a first verification value by hashing a second string including the first secret key element X, the second secret key element Y, the hash value I of the ID, the session key sk and the password using a third random hash function $h_3$; and transmitting, at the terminal, the first verification value to the server.

The session key sk may be calculated according to the following equation:

$$sk = h_2(X, (Y, I), (YI^e)^x)$$

The terminal may transmit the ID to the server together with the first secret key element X or the first verification value.

The authentication method may further include: after the transmitting of the first verification value to the server, receiving, at the terminal, a second verification value from the server; and verifying, at the terminal, the second verification value using the first secret key element X, the second secret key element Y, the hash value I of the ID, the session key sk, the password, and a fourth random hash function $h_4$.

According to another aspect of the present disclosure, there is provided an authentication method including: generating, at a server, an ID-based secret key K using an ID of a user of a terminal and key generation factors exchanged with the terminal; receiving, at the server, an encrypted password of the user from the terminal; and decrypting, at the server, the encrypted password using a symmetric key decryption algorithm taking the generated secret key K as a symmetric key, and authenticating the terminal user using the decrypted password.

The generating of the secret key K may include: having, at the server, a private key $s_{ID}$ corresponding to the ID issued by a private key generator (PKG); receiving, at the server, a first secret key element X from the terminal; and transmitting, at the server, a second secret key element Y calculated from a server-side random number y to the terminal. Then, the server may generate the secret key K using the first secret key element X, the server-side random number y, the second secret key element Y, the ID, and the private key $s_{ID}$.

The server may generate a common hash value e using the first secret key element X, the second secret key element Y, and a hash value I of the ID, and may generate the secret key K using the common hash value e, the first secret key element X, the server-side random number y, the second secret key element Y, the hash value I of the ID, and the private key $s_{ID}$.

The secret key K may be generated by hashing a first string including the common hash value e, the first secret key element X, the server-side random number y, the second secret key element Y, the hash value I of the ID, and the private key $s_{ID}$.

The private key $s_{ID}$ may be calculated according to the following equation:

$$s_{ID} = \log_g H(ID) = \Sigma_{i=1}^{\alpha} s_{IDi}$$

(where g is a generator of a cyclic subgroup G generated from $g = \hat{g}^2$ when a maximal cyclic subgroup of a finite group $Z_N = \{0, 1, 2, \ldots, N-1\}$ is $\hat{g}$, N is an integer satisfying N=pq, p and q are prime numbers that satisfy p≡3 (mod 4) and q≡3 (mod 4) respectively, $ID_i$ is an $i^{th}$ character constituting the ID, α is a length of the ID, $H(ID) = (h(ID))^2 = \Pi_{i=1}^{\alpha}(h(ID_i))^2$, h is a random hash function satisfying h: $\{0, 1\}^* \rightarrow Z_N$, and $s_{IDi} = \log_g H(ID_i)$).

The second secret key element Y may be calculated according to the following equation:

$$Y = g^y$$

The secret key K may be calculated according to the following equation:

$$K = h_1(X,(Y,I),X^{y+sID^*e})$$

(where $h_1$ is a first random hash function, I=H(ID), and H is a hash function satisfying H: $\{0, 1\}^* \rightarrow G$).

The authentication method may further include: after the authenticating of the terminal user, receiving, at the server, a first verification value from the terminal; generating, at the server, a session key sk by hashing a string including the common hash value e, the first secret key element X, the server-side random number y, the second secret key element Y, the hash value I of the ID, and the private key $s_{ID}$ using a second random hash function $h_2$; and verifying, at the server, the first verification value using the first secret key element X, the second secret key element Y, the hash value I of the ID, the session key sk, the decrypted password, and a third random hash function $h_3$.

The session key sk may be calculated according to the following equation:

$$sk = h_2(X,(Y,I),X^{y+sID^*e})$$

The server may receive the ID together with the first secret key element X or the first verification value.

The authentication method may further include: after the verifying of the first verification value, generating, at the server, a second verification value by hashing a second string including the first secret key element X, the second secret key element Y, the hash value I of the ID, the session key sk, and the password using a fourth random hash function $h_4$; and transmitting, at the server, the second verification value to the terminal.

The authenticating of the terminal user may include: generating, at the server, a message authentication code (MAC) value of the decrypted password using a hardware security module (HSM); and determining whether or not the generated MAC value is equal to a previously stored value.

According to still another aspect of the present disclosure, there is provided an apparatus including: at least one processor; a memory; and at least one program. The at least one program is stored in the memory, and configured to be executed by the at least one processor. The program includes commands for: generating an ID-based secret key using an ID of a user of a terminal and key generation factors exchanged with a server; encrypting a password of the user using a symmetric key encryption algorithm taking the generated secret key as a symmetric key, and requesting authentication for the terminal user by transmitting the encrypted password to the server; and receiving a response to the authentication request from the server.

According to yet another aspect of the present disclosure, there is provided an apparatus including: at least one processor; a memory; and at least one program. The at least one program is stored in the memory, and configured to be executed by the at least one processor. The program includes commands for: generating an ID-based secret key using an ID of a user of a terminal and key generation factors exchanged with the terminal; receiving an encrypted password of the user from the terminal; and decrypting the encrypted password using a symmetric key decryption algorithm taking the generated secret key as a symmetric key, and authenticating the terminal user using the decrypted password.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
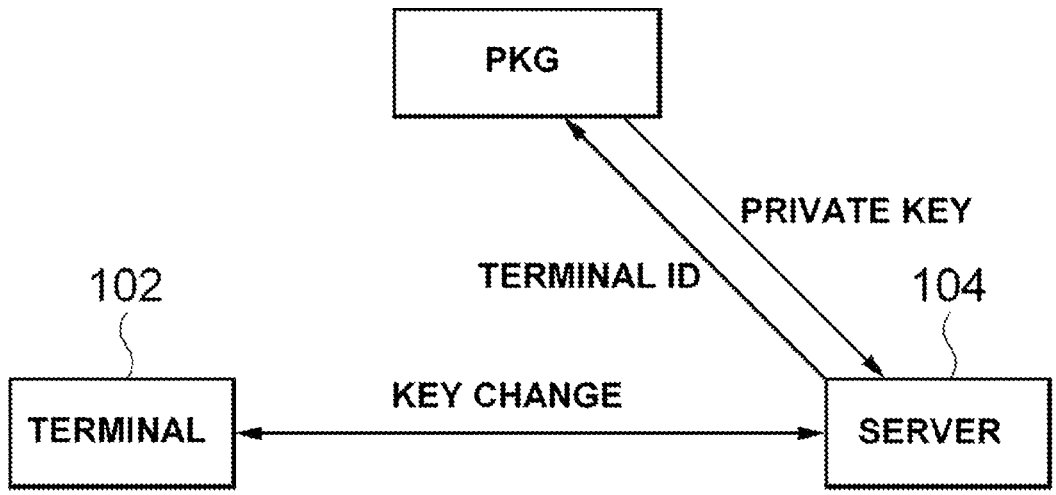
FIG. 1 is a block diagram illustrating a password-based authentication system according to an exemplary embodiment of the present disclosure.

FIG. 1 is a block diagram illustrating a password-based authentication system 100 according to an exemplary embodiment of the present disclosure. The password-based authentication system 100 according to an exemplary embodiment of the present disclosure includes a terminal 102, a server 104, and a private key generator (PKG) 106.

The terminal 102 generates an identifier (ID)-based secret key K between the terminal 102 itself and the server 104 for safe communication. In other words, to generate and verify the secret key K, an ID and a password of a user of the terminal 102 are used. The ID denotes identification information uniquely given to the user of the terminal 102 to identify the user. Also, the password is a secret string used together with the ID by the user to log in to the server 104. In an exemplary embodiment of the present disclosure, the ID and the password of the user may not only be used by the user to log in to the server 104 but may also be used as an element for generating the secret key K.

Using the ID of the terminal user and key generation factors exchanged with the server 104, the terminal 102 generates the ID-based secret key K. Specifically, to generate the secret key K, the terminal 102 generates a terminal-side random number x and calculates a first secret key element X from the terminal-side random number x. Also, the terminal 102 receives a second secret key element Y from the server 104, and generates the secret key K using the terminal-side random number x, the first secret key element X, the second secret key element Y, and the ID of the user. In other words, in an exemplary embodiment of the present disclosure, the key generation factors for the terminal 102 to generate the secret key K may include the terminal-side random number x, the first secret key element X, and the second secret key element Y.

When the secret key K is generated, the terminal 102 encrypts the password of the user using a symmetric key encryption algorithm taking the generated secret key K as a symmetric key, and transmits the encrypted password to the server 104, thereby requesting authentication for the terminal user.

For safe communication with the terminal 102, the server 104 generates the ID-based secret key K using the ID of the terminal user and the key generation factors exchanged with the terminal 102. First, the server 104 transmits the ID of the user to the PKG 106, and is issued with a private key $s_{ID}$ corresponding to the ID. Also, the server 104 receives the first secret key element X from the terminal 102, generates a server-side random number y separately from the first secret key element X, and then calculates the second secret key element Y from the server-side random number y. Subsequently, the server 104 generates the secret key K using the first secret key element X, the server-side random number y, the second secret key element Y, the ID, and the private key $s_{ID}$. In other words, the key generation factors for the server 104 to generate the secret key K may include the first secret key element X, the server-side random number y, the second secret key element Y, and the private key $s_{ID}$. Here, the secret key K generated by the server 104 is the same as the secret key K generated by the terminal 102. In other words, in an exemplary embodiment of the present disclosure, the terminal 102 and the server 104 can share the same secret key K without directly exchanging the secret key K with each other. A detailed method for the terminal 102 and the server 104 to generate the secret key K will be described later. Meanwhile, the server 104 may include a separate hardware security module (HSM) for authenticating the password received from the terminal 102, which will be described later with reference to FIG. 3.

When the secret key K is generated, the server 104 receives the encrypted password of the user from the terminal 102, decrypts the encrypted password using a symmetric key decryption algorithm taking the generated secret key K as a symmetric key, authenticates the terminal user using the decrypted password, and then transmits the authentication result to the terminal 102.

The PKG 106 receives the ID from the server 104 and issues the private key $s_{ID}$ corresponding to the received ID. Here, the private key $s_{ID}$ is a discrete logarithm of the ID, and the PKG 106 calculates the private key $s_{ID}$ corresponding to the received ID on the basis of a previously set system parameter, a master key of the PKG 106 itself, and pre-calculated data corresponding to a trapdoor discrete logarithm (TDL) group. A detailed method of generating the private key $s_{ID}$ will be described later.

Figure 2:
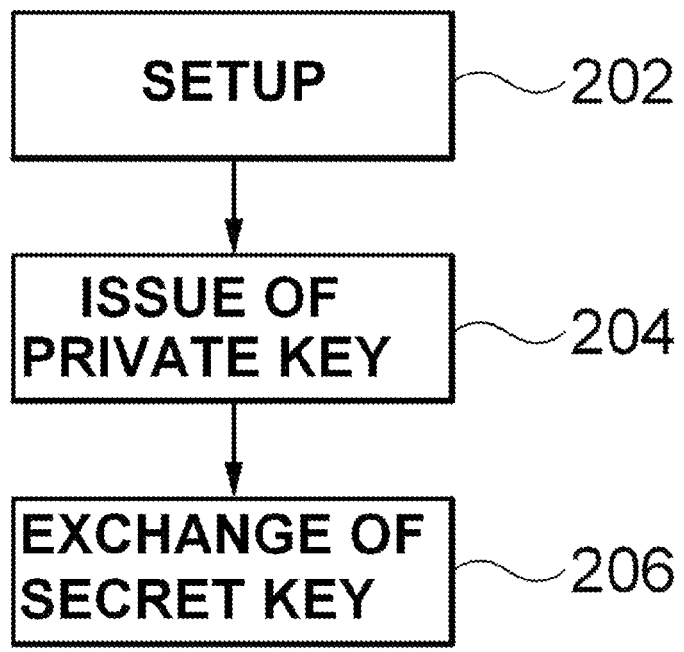
FIG. 2 is a diagram illustrating overall steps of a password-based authentication algorithm according to an exemplary embodiment of the present disclosure.

A detailed authentication method in the password-based authentication system 100 having the above-described constitution will be described below. As shown in FIG. 2, a password-based authentication method 200 according to an exemplary embodiment of the present disclosure is divided into three steps including setup 202, issue of a private key 204, and key exchange 206. In the setup step 202 among the steps, components of the overall system 100 are defined, and in the private key issuing step 204, the PKG 106 generates a private key corresponding to an ID on the basis of a master key in response to a request of the server 104. In the key exchange step 206, a secret key K common to the terminal 102 and the server 104 is generated, and a session key sk is generated from the secret key K.

Setup 202

In the setup step according to an exemplary embodiment of the present disclosure, parameters and a master key used to exchange a secret key between the terminal 102 and the server 104 are defined.

First, from two similar large prime numbers p and q that satisfy p≡3 (mod 4) and q≡3 (mod 4) respectively and are B smooth, N=pq is calculated. Here, p and q are prime numbers that satisfy a security level corresponding to a given security parameter and are cryptographically safe. A security parameter denotes an element of an algorithm whereby time and cost of a basic attack on an encryption algorithm are determined. Here, the basic attack denotes an attack based on exhaustive search of searching all possible key candidates until a key satisfying given data (plaintext and ciphertext) is found. Since time taken for an exhaustive search depends on the number of possible keys, and the number of keys is determined according to a length of the keys, the security parameter denotes the length of the keys in this case. A value of B may be appropriately set for the security level.

Next, a hash function H and a random hash function $h_i$ used to exchange secret keys are defined. Suppose that a generator of a maximal cyclic subgroup of a finite group $Z_N = \{0, 1, 2, \ldots, N-1\}$ is $\tilde{g}$. Then, when a cyclic subgroup generated from $g = \tilde{g}^2$ is G, the hash function H is defined as Equation 1 below.

$$H: \{0,1\}^* \to G \qquad [\text{Equation 1}]$$

(where $\{0, 1\}^*$ is an arbitrary finite bit column consisting of 0 and 1)

In other words, when an ID is an input value, the hash function H is defined such that an output value of the hash function H becomes an element of the group G. For example, when there is a random hash function h: $\{0, 1\}^* \to Z_n$, the hash function H may be defined as Equation 2 below.

$$H(ID)=h(ID)^2 \qquad \text{[Equation 2]}$$

Also, the hash function $h_i$ is defined as Equation 3 below.

$$h_i:\{0,1\}^* \to \{0,1\}^{ni} \qquad \text{[Equation 3]}$$

(where $\{0, 1\}^{ni}$ means a string of $n_i$ bits each of which has an arbitrary value of 0 or 1, and i∈$\{0, 1, 2, 3, 4, 5, 6\}$)

In other words, in an exemplary embodiment of the present disclosure, six random hash functions are used, and the number of bits of an output value of each random hash function may be appropriately determined for details of an algorithm. In other words, values of $n_0$ to $n_6$ may be appropriately set according to need. As the respective random hash functions, for example, SHA1, SHA-256, SHA-512, etc. may be used also, but the present disclosure is not limited to a specific function. Also, although each random hash function has a value of 0 to 6 in the above exemplary embodiment, the values are merely intended to distinguish the respective random hash functions from each other, and do not denote a specific sequence of the random hash functions.

A system parameter $param_R$ and a masker key mk derived through such a process are as follows.

$$param_R = \{N, G, g, H, h_0, h_1, h_2, h_3, h_4, h_5, h_6\}$$

$$mk = (p, q)$$

Issue of Private Key 204

In this step, the PKG 106 issues a private key $s_{ID}$ on the basis of an ID received from the server 104. The PKG 106 calculates a private key corresponding to the given ID on the basis of the system parameter $param_R$, the master key mk, and pre-calculated data corresponding to a TDL group. When a trapdoor is known although it is cryptographically impossible to calculate a discrete logarithm, there is a group whose discrete logarithm can be easily calculated, and the group is called a TDL group. In the present disclosure, a private key corresponding to each ID is calculated using characteristics of such a TDL group. In other words, the PKG 106 stores pre-calculated data of respective values corresponding to the master key mk and the TDL group in the form of, for example, a table, etc., and calculates a private key corresponding to a received ID using the received ID and the pre-calculated data stored in the table.

Specifically, the PKG 106 separates the received ID character by character or number by number, thereby expressing the ID as ID=$ID_1 \| ID_2 \| \ldots \| ID_\alpha$ (where $\alpha$ is a length of the ID). For example, when the ID is abc01, it may be expressed as $ID_1$=a, $ID_2$=b, $ID_3$=c, $ID_4$=0, $ID_6$=1. In other words, $ID_i$ denotes an $i^{th}$ character constituting the ID. The PKG 106 converts each $ID_i$ into an element of a TDL group G using the hash function H, and calculates a discrete logarithm to the base g of $H(ID_i)$ using the aforementioned pre-calculated data. This is expressed as an equation below.

$$s_{IDi} = \log_g H(ID_i) \qquad \text{[Equation 4]}$$

Here, as described in Equation 2, H(ID) has the relationship of $H(ID)=(h(ID))^2=\Pi_{i=1}^{\alpha}(h(ID_i))^2$ with the random hash function h.

The private key $s_{ID}$ corresponding to the ID is calculated according to Equation 5 below.

$$s_{ID} = \log_g H(ID) = \Sigma_{i=1}^{\alpha} s_{IDi} \qquad \text{[Equation 5]}$$

The private key $s_{ID}$ calculated in this way is delivered to the server 104 through a safe channel.

Key Exchange 206

Figure 3:
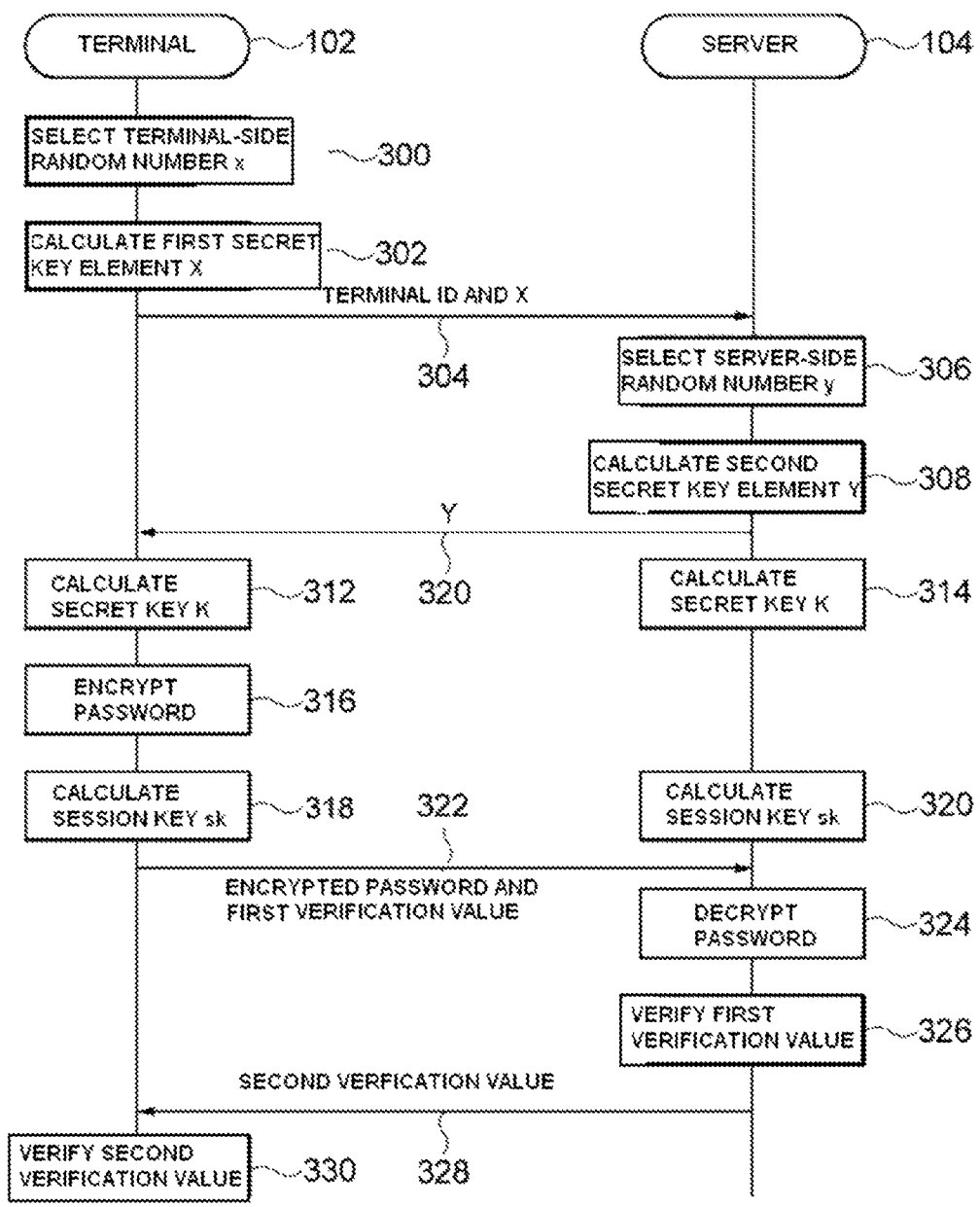
FIG. 3 is a diagram illustrating a key exchange step of a password-based authentication algorithm in detail according to an exemplary embodiment of the present disclosure.

In this step, the secret key K for safe communication between the terminal 102 and the server 104 is exchanged, and the session key sk is generated using the secret key K. FIG. 3 is a block diagram illustrating the key exchange step 206 according to an exemplary embodiment of the present disclosure First, the terminal 102 selects a terminal-side random number x from $Z_N$ according to the system parameter $param_R$ defined in step 202 (300), and calculates the first secret key element X from the terminal-side random number x (302). At this time, the first secret key element X is calculated according to Equation 6 below.

$$X = g^x \qquad \text{[Equation 6]}$$

(where g is a generator of the cyclic subgroup G, N is an integer satisfying N=pq, and p and q are prime numbers that satisfy p≡3 (mod 4) and q≡3 (mod 4) respectively).

When the first secret key element X is calculated as described above, the terminal 102 transmits the first secret key element X to the server 104 (304). Also, as shown in the drawing, the terminal may transmit the ID to the server 104 together with the first secret key element X. However, the ID is not necessarily transmitted in this step, and may be transmitted together with a first verification key in step 320 to be described later according to an exemplary embodiment.

Meanwhile, the server 104 selects a server-side random number y from $Z_N$ (306), and calculates the second secret key element Y from the server-side random number y (308). At this time, the second secret key element Y is calculated according to Equation 7 below.

$$X = g^y \qquad \text{[Equation 7]}$$

When the second secret key element Y is calculated as described above, the server 104 transmits the second secret key element Y to the terminal 102.

In the drawing according to this embodiment, it is illustrated that the server 104 receives the ID and the first secret key element X from the terminal 102, and then performs steps 306 and 308, but exemplary embodiments of the present disclosure are not limited to this case. In other words, in an exemplary embodiment of the present disclosure, steps 306 and 308 are separately performed from steps 300 and 302. According to exemplary embodiments, the second secret key element Y may be generated in advance of the first secret key element X, or may be simultaneously generated with the first secret key element X. Also, in an exemplary embodiment of the present disclosure, the first secret key element X and the second secret key element Y may be values that are calculated and stored in advance in the terminal 102 and the server 104, respectively. In this case, it is all right to only load the stored values without performing steps 300 and 302 and steps 306 and 308 so as to use this password-based authentication method 200, and thus overhead for calculating the first secret key element X and the second secret key element Y is removed (assuming that it is possible to ignore computation time of a hash function, a symmetric key cryptographic algorithm, a multiplication operation, etc.).

When the first secret key element X and the second secret key element Y are exchanged between the terminal and the server 104 as described above, the terminal 102 and the server 104 separately calculate the secret key K.

First, the terminal 102 calculates a common hash value ($e=h_0(X, Y, I)$) using the first secret key element X, the second secret key element Y, a hash value I of the ID, and the hash function $h_0$.

Next, the terminal 102 hashes a first string including the calculated common hash value e, the terminal-side random number x, the first secret key element X, the second secret key element Y, and the hash value I of the ID, thereby generating the secret key K (312). This is expressed as Equation 8 below.

$$K=h_1(X,(Y,I),(YI^e)^x) \quad \text{[Equation 8]}$$

(where I=H(ID))

Likewise, the server 104 calculates the common hash value ($e=h_0(X, Y, I)$) using the first secret key element X, the second secret key element Y, the hash value I of the ID, and the hash function $h_0$, and hashes a first string including the common hash value e, the first secret key element X, the server-side random number y, the second secret key element Y, the hash value I of the ID, and the private key $s_{ID}$, thereby generating the secret key K (314). This is expressed as Equation 9 below.

$$K=h_1(X,(Y,I),X^{y+sID*e}) \quad \text{[Equation 9]}$$

As mentioned above, the private keys K generated in step 312 and step 314 are identical. In other words, according to exemplary embodiments of the present disclosure, the terminal 102 and the server 104 can generate the common secret key K without a secret key exchange process between them. In addition, to generate the secret key K, each of the terminal 102 and the server 104 may perform only one exponentiation operation for obtaining the first secret key element X or the second secret key element Y, and thus the amount of computation for generating the secret key K is remarkably reduced compared to related art.

When the secret key K common to the terminal 102 and the server 104 is generated as described above, the terminal 102 encrypts a password of the terminal 102 using a symmetric key encryption algorithm $E_k$ taking the secret key K as a symmetric key (316). Subsequently, the encrypted passwords is delivered to the server 104 and used to authenticate the terminal 102.

Next, the terminal 102 hashes a string including the common hash value e, the terminal-side random number x, the first secret key element X, the second secret key element Y, and the hash value I of the ID using a second hash function $h_2$, thereby generating the session key sk (318). This is expressed as an equation below.

$$sk=h_2(X,(Y,I),(YI^e)^x) \quad \text{[Equation 10]}$$

Likewise, the server 104 hashes a string including the common hash value e, the first secret key element X, the server-side random number y, the second secret key element Y, the hash value I of the ID, and the private key $s_{ID}$ using the second hash function $h_2$, thereby generating the session key sk (320). This is expressed as an equation below.

$$sk=h_2(X,(Y,I),X^{y+sID*e}) \quad \text{[Equation 11]}$$

Subsequently, the terminal 102 generates a first verification value by hashing a second string including the first secret key element X, the second secret key element Y, the hash value I of the ID, the session key sk, and the password using a third hash function $h_3$, encrypts the password using the generated secret key K, and transmits the first verification value and the encrypted password $E_k(pw)$ to the server 104 (322). At this time, the first verification value may be calculated according to an equation below.

$$\text{First verification value}=h_3(X,Y,I,sk,PW) \quad \text{[Equation 12]}$$

As mentioned above, when the ID has not been transmitted in step 304, the ID may be transmitted together in this step.

The server 104 receiving the first verification value decrypts the encrypted password using the same symmetric key encryption algorithm as the terminal 102, and authenticates a user using the decrypted password and the ID (324). In other words, the password decrypted by the server 104 is used together with the ID to authenticate the user of the terminal 102.

For user authentication, the server 104 may be configured to record passwords of respective users in a separate storage space, such as a database, etc., and check whether or not the password received from the terminal 102 and decrypted and a previously stored password are identical. Also, according to exemplary embodiments, the server 104 may store and manage the password itself, store a hash value of the password, or store a message authentication code (MAC) value calculated using the separate HSM.

In exemplary embodiments of the present disclosure, the HSM is equipment that performs hardware computation using a digital key for strong authentication. In general, the HSM is implemented in the form of a plug-in card or an embedded chip, and has at least one secure cryptoprocessor safe from tampering, bus probing, or so on. Use of such HSM enables more secure password management compared to an existing hashing scheme, and so on.

A method for the server 104 to perform password matching using the HSM will now be described. First, in the database, the server 104 does not store the simple hash value of the password but stores a MAC value MAC_k(pw) in which a secret key $k_{HSM}$ of the HSM prepared in the server 104 is reflected.

After that, when the encrypted password is transmitted from the terminal 102 in step 322, the server 104 decrypts the encrypted password received from the terminal 102 (324) and inputs the decrypted password in the HSM. Then, the HSM calculates the MAC value MAC_k(pw) using the password provided by the server 104 and the secret key $k_{HSM}$ stored in the HSM, and delivers the calculated MAC value MAC_k(pw) to the server 104. Subsequently, the server 104 compares a previously stored MAC value stored in the database with the MAC value MAC_k(pw) calculated by the HSM, thereby authenticating the user.

Basically, the MAC computation time is similar to computation time for symmetric key encryption, and thus this method provides improved security and similar efficiency compared to a related method. Since a key value is reflected in a MAC, unlike a general hash function, an output of the MAC does not only simply provide randomness according to a password length but also provide cryptographic safety (e.g., the same safety as existing AES-128 when the key value is 128 bits) according to the key value, thereby fundamentally making password cracking impossible.

On the other hand, in case of an existing password-based key exchange method, it is impossible to deliver a password itself due to an algorithm of the method, and just a value to check whether or not a decrypted password matches a previously stored password is delivered. Thus, to use HSM according to the existing algorithm, an exponentiation operation or a public key cryptographic operation that is 2000 times or more slower than the proposed method is necessary. For this reason, according to the related art, it is impossible to use HSM for a login operation that very frequently occurs between a server and a client. However, exemplary embodiments of the present disclosure make it possible to directly deliver an encrypted password to a server using a secret key, and thus it is possible to remarkably increase the security of a key exchange and authentication process by applying HSM without increasing the load of the server in a process of user login, or so on.

When the above-described password decryption and authentication are finished, the server 104 verifies the first verification value using the decrypted password (326). In this step, the server 104 may separately generate a first verification value using factors that the server 104 knows, that is, the first secret key element X, the second secret key element Y, the hash value I of the ID, the session key sk, the decrypted password, and the third random hash function $h_3$, and compare the generated first verification value with the received value, thereby verifying the first verification value. When the two values are identical to each other, the verification succeeds, and when the two values are not identical, the verification fails.

Subsequently, the server 104 generates a second verification value by hashing the second string including the first secret key element X, the second secret key element Y, the hash value I of the ID, the session key sk, and the password using a fourth hash function $h_4$, and transmits the generated second verification value to the terminal 102 (328). At this time, the second verification value may be calculated according to an equation below.

$$\text{Second verification value} = h_4(X,Y,I,sk,PW) \quad \text{[Equation 13]}$$

Subsequently, the terminal 102 generates a second verification value using values that the terminal 102 itself knows, that is, the first secret key element X, the second secret key element Y, the hash value I of the ID, the session key sk, the password, and the fourth random hash function $h_4$, and compares the generated second verification value with the received value, thereby verifying the second verification value. When the two values are identical to each other, the verification succeeds, and when the two values are not identical, the verification fails. In the present disclosure, when the verification of the first verification value and the verification of the second verification value both succeed, it is possible to determine that session key exchange has succeeded.

Meanwhile, an exemplary embodiment of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. A computer, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

By applying ID-based cryptography to an existing password-based authentication and key exchange protocol according to exemplary embodiments of the present disclosure, it is possible to ensure the forward security and the backward security without public key authentication for key exchange.

In addition, the difficulties in migration of an existing server, subsequent parameter updates, etc. that designated as a problem of existing password authenticated key exchange (PAKE) based on a public key certificate are solved. Furthermore, since it is all right for each of a client and a server to perform only one exponentiation operation for key exchange, it is possible to remarkably reduce the amount of computation compared to an existing algorithm.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An authentication method, of a terminal, comprising:
   generating an identifier (ID)-based secret key K using an ID of a user of the terminal and key generation factors exchanged with a server;
   encrypting a password of the user using a symmetric key encryption algorithm taking the ID-based secret key K generated by the terminal as a symmetric key;
   requesting authentication for the terminal user by transmitting the encrypted password to the server; and
   receiving a response to the authentication request from the server,
   wherein the response is determined using a hardware security module (HSM) of the server, and
   wherein the generating of the secret key K includes:
      transmitting, to the server, a first secret key element X calculated from a terminal-side random number x;
      receiving, from the server, a second secret key element Y;
      generating the secret key K using the terminal-side random number x, the first secret key element X, the second secret key element Y, and the ID; and
      generating a common hash value e using the first secret key element X, the second secret key element Y, and a hash value I of the ID, wherein the generating of the secret key K is performed using the common hash value e, the terminal-side random number x, the first secret key element X, the second secret key element Y, and the hash value I of the ID.

2. The authentication method of claim 1, wherein the generating of the secret key K is performed by hashing a first string including:
   the common hash value e,
   the terminal-side random number x,
   the first secret key element X, the second secret key element Y, and
the hash value I of the ID.

3. The authentication method of claim 2, wherein the first secret key element X is calculated according to the following equation:

$$X=g^x$$

where:
g is a generator of a cyclic subgroup G generated from $g=\tilde{g}^z$ when a maximal cyclic subgroup, of a finite group $Z_N=\{0, 1, 2, \ldots, N-1\}$, is $\tilde{g}$,
N is an integer satisfying N=pq, and
p and q are prime numbers that satisfy p≡3 (mod 4) and q≡3 (mod 4) respectively.

4. The authentication method of claim 3, wherein the secret key K is calculated according to the following equation:

$$K=h_1(X,(Y,I),(YI^e)^x)$$

where:
$h_1$ is a first random hash function,
I=H(ID), and
H is a hash function satisfying H:$\{0, 1\}^* \to G$.

5. The authentication method of claim 4, further comprising, after the transmitting of the encrypted password to the server:
generating a session key sk by hashing a string including: the common hash value e, the terminal-side random number x, the first secret key element X, the second secret key element Y, and the hash value I of the ID using a second random hash function $h_2$;
generating a first verification value by hashing a second string including: the first secret key element X, the second secret key element Y, the hash value I of the ID, the session key sk and the password using a third random hash function $h_3$; and
transmitting, to the server, the first verification value.

6. The authentication method of claim 5, wherein the session key sk is calculated according to the following equation:

$$sk=h_2(X,(Y,I),(Yr)^x).$$

7. The authentication method of claim 5, wherein the terminal transmits the ID to the server together with one of the first secret key element X and the first verification value.

8. The authentication method of claim 5, further comprising, after the transmitting of the first verification value to the server:
receiving, from the server, a second verification value; and
verifying the second verification value using the first secret key element X, the second secret key element Y, the hash value I of the ID, the session key sk, the password, and a fourth random hash function $h_4$.

9. An authentication method, of a server, comprising:
generating an identifier (ID)-based secret key K using an ID of a user of a terminal and key generation factors exchanged with the terminal;
receiving, from the terminal, an encrypted password of the user;
decrypting the encrypted password using a symmetric key decryption algorithm taking the ID-based secret key K generated by the server as a symmetric key; and
authenticating the terminal user using the decrypted password and a hardware security module (HSM) of the server,
wherein the generating of the secret key K includes:
storing a private key $s_{ID}$ corresponding to the ID issued by a private key generator (PKG);
receiving, from the terminal, a first secret key element X;
transmitting, to the terminal, a second secret key element Y calculated from a server-side random number y;
generating the secret key K using the first secret key element X, the server-side random number y, the second secret key element Y, the ID, and the private key $s_{ID}$; and
generating a common hash value e using the first secret key element X, the second secret key element Y, and a hash value I of the ID, wherein the generating of the secret key K is performed using the common hash value e, the first secret key element X, the server-side random number y, the second secret key element Y, the hash value I of the ID, and the private key $s_{ID}$.

10. The authentication method of claim 9, wherein the generating of the secret key K is performed by hashing a first string including:
the common hash value e,
the first secret key element X,
the server-side random number y,
the second secret key element Y,
the hash value I of the ID, and
the private key $s_{ID}$.

11. The authentication method of claim 10, wherein the private key $s_{ID}$ is calculated according to the following equation:

$$s_{ID}=\log_g H(ID)=\Sigma_{i=1}^{\alpha} s_{IDi}$$

where:
g is a generator of a cyclic subgroup G generated from $g=\tilde{g}^z$ when a maximal cyclic subgroup, of a finite group $Z_N=\{0, 1, 2, \ldots, N-1\}$, is $\tilde{g}$,
N is an integer satisfying N=pq,
p and q are prime numbers that satisfy p≡3 (mod 4) and q≡3 (mod 4) respectively,
$ID_i$ is an $i^{th}$ character constituting the ID,
α is a length of the ID, $H(ID)=(h(ID))^2=\lceil_{i=1}^{\alpha}(h(ID_i))^2$,
h is a random hash function satisfying h: $\{0, 1\} \to Z_N$,
$s_{IDi}=\log_g H(ID_i)$, and
H is a hash function satisfying H:$\{0, 1\}^* \to G$.

12. The authentication method of claim 11, wherein the second secret key element Y is calculated according to the following equation:

$$Y=g^y.$$

13. The authentication method of claim 12, wherein the secret key K is calculated according to the following equation:

$$K=h_1(X,(Y,I),X^{y+sID*e})$$

where:
$h_1$ is a first random hash function,
I=H(ID), and
H is a hash function satisfying H:$\{0, 1\}^* \to G$.

14. The authentication method of claim 13, further comprising, after the authenticating of the terminal user:
receiving, from the terminal, a first verification value;
generating a session key sk by hashing a string including: the common hash value e, the first secret key element X, the server-side random number y, the second secret key element Y, the hash value I of the ID, and the private key $s_{ID}$ using a second random hash function $h_2$; and verifying the first verification value using the first secret key element X, the second secret key element Y, the hash value I of the ID, the session key sk, the decrypted password, and a third random hash function $h_3$.

15. The authentication method of claim 14, wherein the session key sk is calculated according to the following equation:

$$sk = h_2(X, (Y,I), X^{y+sID*e}).$$

16. The authentication method of claim 14, wherein the server receives the ID together with one of the first secret key element X and the first verification value.

17. The authentication method of claim 14, further comprising, after the verifying of the first verification value:
  generating a second verification value by hashing a second string including: the first secret key element X, the second secret key element Y, the hash value I of the ID, the session key sk, and the password using a fourth random hash function $h_4$; and
  transmitting, to the terminal, the second verification value.

18. The authentication method of claim 9, wherein the authenticating of the terminal user includes:
  generating a message authentication code (MAC) value of the decrypted password using the HSM; and
  determining whether the generated MAC value corresponds to a previously stored value.

19. A non-transitory computer-readable recording medium storing a terminal program configured to enable a hardware processor of a computer to perform operations comprising:
  generating an identifier (ID)-based secret key K using an ID of a user of the terminal and key generation factors exchanged with a server;
  encrypting a password of the user using a symmetric key encryption algorithm taking the ID-based secret key K generated by the terminal as a symmetric key;
  requesting authentication for the terminal user by transmitting the encrypted password to the server; and
  receiving a response to the authentication request from the server,
  wherein the response is determined using a hardware security module (HSM) of the server, and
  wherein the generating of the secret key K includes:
    transmitting, to the server, a first secret key element X calculated from a terminal-side random number x;
    receiving, from the server, a second secret key element Y;
    generating the secret key K using the terminal-side random number x, the first secret key element X, the second secret key element Y, and the ID; and
    generating a common hash value e using the first secret key element X, the second secret key element Y, and a hash value I of the ID, wherein the generating of the secret key K is performed using the common hash value e, the terminal-side random number x, the first secret key element X, the second secret key element Y, and the hash value I of the ID.

20. A non-transitory computer-readable recording medium storing a server program configured to enable a hardware processor of a computer to perform operations comprising:
  generating an identifier (ID)-based secret key K using an ID of a user of a terminal and key generation factors exchanged with the terminal;
  receiving, from the terminal, an encrypted password of the user;
  decrypting the encrypted password using a symmetric key decryption algorithm taking the ID-based secret key K generated by the server as a symmetric key; and
  authenticating the terminal user using the decrypted password and a hardware security module (HSM) of the server,
  wherein the generating of the secret key K includes:
    storing a private key $s_{ID}$ corresponding to the ID issued by a private key generator (PKG);
    receiving, from the terminal, a first secret key element X;
    transmitting, to the terminal, a second secret key element Y calculated from a server-side random number y;
    generating the secret key K using the first secret key element X, the server-side random number y, the second secret key element Y, the ID, and the private key $s_{ID}$; and
    generating a common hash value e using the first secret key element X, the second secret key element Y, and a hash value I of the ID, wherein the generating of the secret key K is performed using the common hash value e, the first secret key element X, the server-side random number y, the second secret key element Y, the hash value I of the ID, and the private key $s_{ID}$.

21. An apparatus, comprising:
at least one hardware processor;
a memory accessible by the hardware processor; and
at least one program stored in the memory,
wherein the at least one program is configured to be executed by the at least one hardware processor, and includes commands enabling the hardware processor to:
  generate an identifier (ID)-based secret key using an ID of a user of a terminal and key generation factors exchanged with a server;
  encrypt a password of the user using a symmetric key encryption algorithm taking the ID-based secret key generated by the terminal as a symmetric key;
  request authentication for the terminal user by transmitting the encrypted password to the server; and
  receive a response to the authentication request from the server,
  wherein the response is determined using a hardware security module (HSM) of the server, and
  wherein the commands enabling the hardware processor to generate the secret key K includes commands enabling the hardware processor to:
    transmit, to the server, a first secret key element X calculated from a terminal-side random number x;
    receive, from the server, a second secret key element Y;
    generate the secret key K using the terminal-side random number x, the first secret key element X, the second secret key element Y, and the ID; and
    generate a common hash value e using the first secret key element X, the second secret key element Y, and a hash value I of the ID, wherein the command enabling the hardware processor to generate the secret key K is performed using the common hash value e, the terminal-side random number x, the first secret key element X, the second secret key element Y, and the hash value I of the ID.

22. An apparatus, comprising:
at least one hardware processor;
a memory accessible by the hardware processor; and at least one program stored in the memory, wherein the at least one program is configured to be executed by the at least one hardware processor, and includes commands enabling the hardware processor to:

generate an identifier (ID)-based secret key using an ID of a user of a terminal and key generation factors exchanged with the terminal;

receive an encrypted password of the user from the terminal;

decrypt the encrypted password using a symmetric key decryption algorithm taking the ID-based secret key generated by a server as a symmetric key; and authenticate the terminal user using the decrypted password and a hardware security module (HSM) of the server, wherein the commands enabling the hardware processor to generate the secret key K includes commands enabling the hardware processor to:

store a private key $s_{ID}$ corresponding to the ID issued by a private key generator (PKG);

receive, from the terminal, a first secret key element X;

transmit, to the terminal, a second secret key element Y calculated from a server-side random number y;

generate the secret key K using the first secret key element X, the server-side random number y, the second secret key element Y, the ID, and the private key $s_{ID}$; and generate a common hash value e using the first secret key element X, the second secret key element Y, and a hash value I of the ID, wherein the command enabling the hardware processor to generate the secret key K is performed using the common hash value e, the first secret key element X, the server-side random number y, the second secret key element Y, the hash value I of the ID, and the private key $s_{ID}$.

* * * * *